United States Patent
Bui et al.

(10) Patent No.: US 7,808,942 B2
(45) Date of Patent: Oct. 5, 2010

(54) POLICY BASED MOBILE-IP ADDRESS SELECTION AND ASSIGNMENT

(75) Inventors: Hung Viet Bui, Chantilly, VA (US); David S. McGinniss, Aurora, IL (US)

(73) Assignee: Sprint Spectrum L.P., Overland Park, KS (US)

( * ) Notice: Subject to any disclaimer, the term of this patent is extended or adjusted under 35 U.S.C. 154(b) by 638 days.

(21) Appl. No.: 11/847,753

(22) Filed: Aug. 30, 2007

(65) Prior Publication Data
US 2009/0061869 A1   Mar. 5, 2009

(51) Int. Cl.
H04B 7/00 (2006.01)
H04W 8/26 (2009.01)
H04L 12/56 (2006.01)

(52) U.S. Cl. .............. 370/310.2; 370/313; 370/389; 370/392; 455/435.1

(58) Field of Classification Search .......... 370/310–348, 370/353–356, 389–392, 400–402; 455/435.2, 455/450, 452.1, 509–516, 406; 379/114.01, 379/114.02
See application file for complete search history.

(56) References Cited

U.S. PATENT DOCUMENTS 7,545,761 B1 *  6/2009  Kalbag ................. 370/310

2003/0154307 A1    8/2003  Puthiyandyil et al.
2004/0218558 A1 * 11/2004  Johansson ............ 370/313
2009/0016270 A1 *  1/2009  Tsirtsis (Georgios) et al. ... 370/328

FOREIGN PATENT DOCUMENTS

EP        0 838 933        4/1998
WO     WO 2007082587      7/2007
WO      WO2007082587   *  7/2007

OTHER PUBLICATIONS

International Search Report and Written Opinion from International Application No. PCT/US2008/072329, dated Feb. 12, 2009.

* cited by examiner

*Primary Examiner*—Afsar M. Qureshi

(57) ABSTRACT

A method for imposing a communication policy for a mobile node. During Mobile-IP (MIP) registration for the mobile node, when a MIP home agent sends an access request to an authentication, authorization, and accounting (AAA) server, the AAA server will select a pool of IP addresses corresponding with a communication policy for the mobile node and will direct the home agent to assign an IP address selected from that pool. Thereafter, when the home agent receives a communication to or from the IP address, the home agent may then determine the applicable communication policy by determining the pool from which the IP address was selected, and the home agent may apply that communication policy.

23 Claims, 4 Drawing Sheets

POLICY BASED MOBILE-IP ADDRESS SELECTION AND ASSIGNMENT

FIELD OF THE INVENTION

The present invention relates to network communications and, more particularly, application of communication policies.

BACKGROUND

It is often necessary to impose special communication policies on network communications passing to or from a particular communication device. For example, when a person acquires a new cellular telephone or other communication device, it may be necessary to initially establish a network service account for the device. To do so, the first time the device attempts network communication, network infrastructure may "hotline" or redirect the device to a provisioning server, which may then interact with the device and its user to establish a service account before allowing the device to engage in further network communication. A similar process may occur when a person attempts to connect with the Internet using a personal computer in a hotel room, where network infrastructure may redirect the user to a local payment collection site before allowing the user to access the Internet.

As another example, when a prepaid or "account balance" subscriber engages in network communication, it may be necessary to route communications by the subscriber through a prepaid accounting platform, to facilitate appropriately decrementing the subscriber's account balance. To do so, when the device attempts network communication, network infrastructure may route the communication to an account balance server, and the server may then route the communication to its destination and begin decrementing the subscriber's account balance. When the communication ends, the server may then stop decrementing the subscriber's account balance.

As still another example, it may be necessary to impose various access control rules on communications to or from a communication device. For instance, to prevent a person from accessing particular network content, blacklist data may specify network addresses that the person's communication device is not permitted to access, or whitelist data may specify the only network addresses that the person's communication device is permitted to access. When the device attempts network communication, network infrastructure may then determine based on the access control rules whether to allow or block the communication, and perhaps whether to hotline the device to another network address.

As yet another example, it may be necessary to report communications by a communication device or to trigger other communication in response to communication by a particular device or person. For instance, when a person's communication device attempts network communication, network infrastructure may be set to detect the communication and to responsively transmit a message to another person or entity, to notify another person or entity of the attempted communication, to seek authorization for the attempted communication, to track the communication for billing or other purposes, or to engage in some other designated communication.

And as yet a further example, it may be necessary to modify communications in various ways (beyond changing destination addresses) during transit. For instance, as a request for content is being conveyed from a client device to a content server, it may be necessary to add user or network information to the request, so that the content server will receive the user or network information together with the request. Similarly, as content is being conveyed from a content server to a client device, it may be necessary to modify the content in some manner, such as to add pricing information in conjunction with links to content for instance. Numerous other examples of special communication policies exist as well or will be developed in the future.

One way to impose special communication policies with respect to communications to or from a communication device is to run specialized program logic at a network access gateway through which such communications pass. In particular, the access gateway may include or have access to a profile data that indicates policies to apply for various communication devices. When the gateway receives a communication to or from a particular communication device, the gateway may then reference the profile data to determine the applicable communication policy (i.e., one or more policies) and may then impose that policy. For instance, the gateway may determine that the device is not yet provisioned for service (e.g., no profile exists yet) and therefore that the device should be hotlined to a provisioning server.

Alternatively, the network access gateway could be dynamically provisioned with policy logic for a particular communication device when the device attempts network connection with the gateway. For instance, when the device first attempts to establish a network connection (e.g., data link layer connection) with the gateway, the device may provide the gateway with a device ID such as a Media Access Control (MAC) ID or the like. The gateway may then transmit an "Access Request" message (typically according to the Remote Authentication Dial-In User Service (RADIUS) protocol) to an authentication, authorization, and accounting (AAA) server, seeking permission to grant the device access to the network. Upon receipt of the Access Request, the AAA server may then reference profile data to determine the applicable policy and may then transmit an Access Accept message to the gateway, specifying within the Access Accept message the applicable policy. The gateway may then apply the specified policy with respect to communications to or from the device. For instance, if the policy is to hotline the device, the gateway may hotline the device.

With the growing mobility of communication devices, however, it can be difficult or costly to program all network access gateways to carry out these functions. Consequently, an improvement is desired.

SUMMARY

The present invention provides an innovative mechanism for imposing communication policies with respect to a communication device such as a mobile node. The invention conveniently leverages the Mobile-IP protocol and the conventional Mobile-IP interaction with an access server such as a AAA server.

As is well known in the art, when a mobile node first connects with a network, the mobile node may engage in a Mobile-IP (MIP) registration process, in which the mobile node (or a proxy operating on behalf of the mobile node) transmits a MIP registration request to a MIP home agent, and the home agent responsively transmits a registration reply assigning an IP address for use by the mobile node to engage in network communications. Thereafter, communications to and from the assigned IP address may be routed through the home agent, so that when the home agent receives communications destined to the mobile node's IP address, the home agent can route the communications to the network on which the mobile node is currently operating.

As is also well known in the art, before a MIP home agent assigns an IP address, the home agent may transmit an Access Request message to a AAA server, seeking permission to grant network access to the mobile node. The AAA server may then conventionally reference profile data to determine whether to grant network access and, if so, may transmit to the home agent an Access Accept message approving network access. The home agent may then conventionally assign an IP address for use by the mobile node.

In accordance with an exemplary embodiment of the invention, the AAA server or other access server will include or have access to pools of IP addresses and data that correlates each pool with a respective communication policy. When a MIP home agent requests the AAA server to approve access for a mobile node, the AAA server will then determine a communication policy for the mobile node (e.g., by reference to profile data or an earlier determination) and, using the correlation data, will select the pool of IP addresses that corresponds with that communication policy. The AAA server will then select an IP address from that pool and will send to the home agent a response that directs the home agent to assign the selected IP address for the mobile node.

Furthermore, the home agent will also include or have access to data that provides similar correlations between pools of IP addresses and communication policies. Thus, when the home agent receives a communication to or from a given IP address, the home agent may determine the pool containing the IP address and may then conveniently refer to the correlation data to determine the corresponding communication policy. The home agent may then readily apply that communication policy with respect to the communication at issue.

Advantageously, this process can allow communication policies to be applied on a per mobile node (or per mobile node group) basis without the need to custom program various access gateways with policy logic. (At the same time, the process does not preclude custom programming of access gateways as well.) In practice, for instance, the process can enable a new (not yet provisioned) mobile node to be hotlined to a provisioning server, and the process can enable various access control rules or other intermediation rules to be applied by the home agent or by platforms invoked by the home agent.

Furthermore, the invention can be applied not only at the time a mobile node first connects with the network, but also (or alternatively) during a communication session involving the mobile node. In particular, during a communication session, if the AAA server determines that a particular communication policy should be applied with respect to the mobile node (such as to hotline the mobile node), the AAA server may simply direct the access gateway to disconnect the mobile node from the network. In response to being disconnected mid-session, the mobile node may then conventionally attempt to reconnect. And when the mobile node attempts to reconnect, the above process can be carried out so as to cause the communication policy to be applied.

These as well as other aspects and advantages will become apparent to those of ordinary skill in the art by reading the following detailed description, with reference where appropriate to the accompanying drawings.

DETAILED DESCRIPTION

Figure 1:
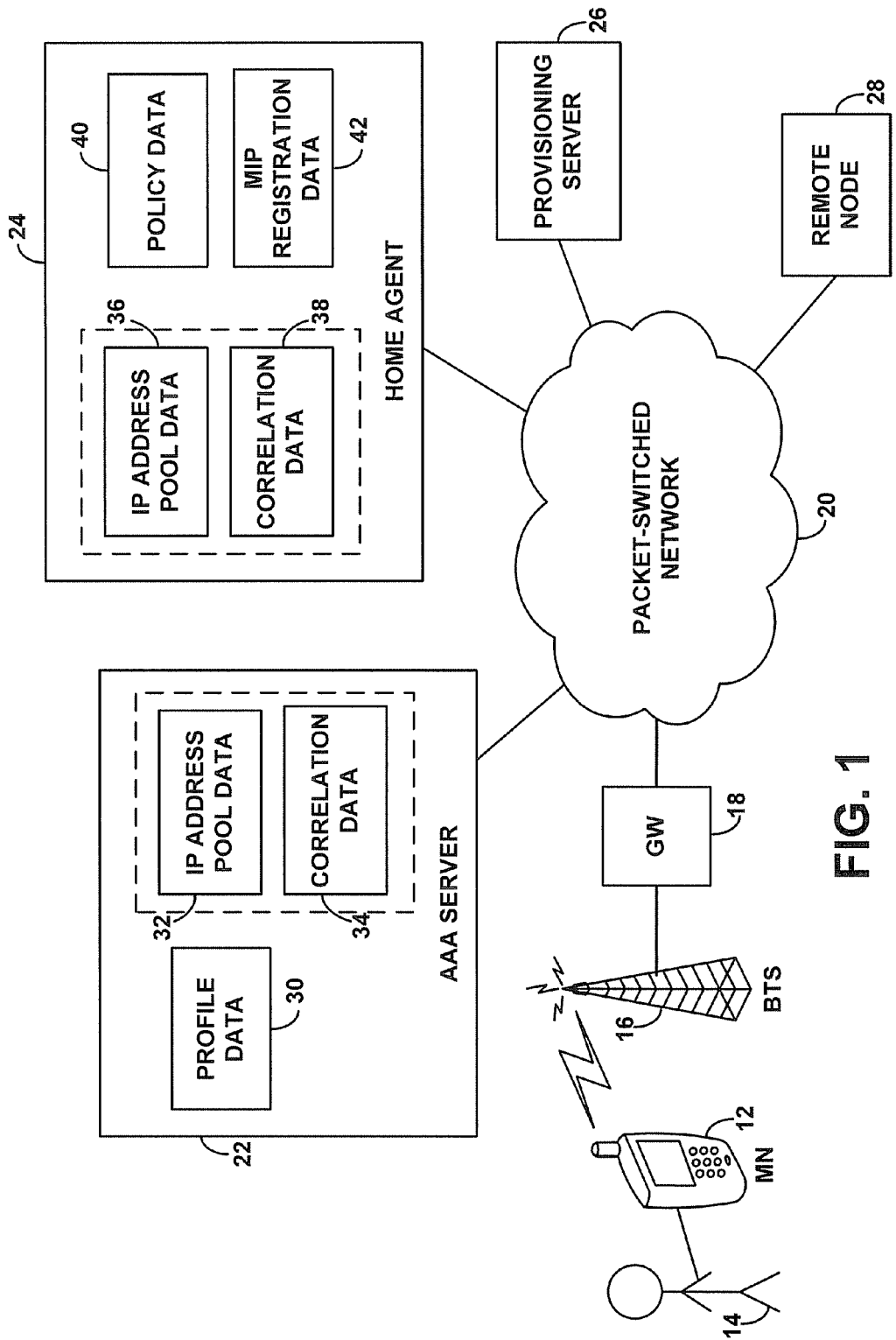
FIG. 1 is a simplified block diagram of a communications network in which an exemplary embodiment of the invention can be implemented.

Referring to the drawings, as noted above, FIG. 1 is a simplified block diagram of a communications network in which an exemplary embodiment of the invention can be implemented. It should be understood, of course, that this and other arrangements and functions described herein (including in the summary section above) are provided by way of example only and that numerous variations may be possible. For instance, structural and functional elements can be added, omitted, combined, distributed, reordered, repositioned, or otherwise changed while remaining within the scope of the invention as defined by the claims. Further, it should be understood that various functions described herein can be carried out by hardware, firmware, and/or software (e.g., one or more processors programmed with machine language instructions to carry out the functions).

FIG. 1 depicts a basic arrangement in which a representative mobile node 12 operated by a user 14 connects via a base station 16 and an access gateway 18 with a packet-switched network 20, so as to be able to engage in packet data communications on the network 20. Sitting on the network 20 are a representative AAA server 22, a representative MIP home agent 24, and various entities with which the mobile node may communicate, such as a provisioning server 26 and a remote node 28 for instance.

The mobile node 12 may be any mobile communication device, examples of which include but are not limited to a cellular telephone, a wirelessly equipped PDA or computer, or any appliance or other device that is equipped with wireless communication functionality, and particularly to communicate over an air interface 15 with base station 16 and to establish connectivity on network 20. The base station 16 may then correspondingly be arranged to serve the mobile node 12 with wireless communication service in accordance with any agreed communication protocol, examples of which include, without limitation, CDMA (e.g., 1xRTT, 1xEV-DO), iDEN, TDMA, AMPS, GSM, GPRS, UMTS, EDGE, WiMAX (e.g., IEEE 802.16), LTE, microwave, satellite, MMDS, Wi-Fi (e.g., IEEE 802.11), Bluetooth, infrared, or other protocols now known or later developed. Details of these protocols are known in the art and are therefore not described in great detail here.

The access gateway 18 may function as a network access server, providing connectivity with the packet-switched network 20. Further, the access gateway 18 may function as a MIP foreign agent in a manner well known in the art. Depending on the communication protocol used, the access gateway 18 may take various forms, examples of which include a packet data serving node (PDSN) and a WiMAX access serving node gateway (ASN-GW). In practice, signaling and bearer communication to and from the mobile node 12 pass through the access gateway 18. Therefore, the access gateway 18 has control over communications to and from the mobile node 12.

The AAA server 22 is shown including profile data 30, IP address pool data 32, and correlation data 34. Although it should be understood that any or all of this data could be stored outside of the AAA server and could still be accessible to the AAA server and perhaps to other network entities. For instance, the profile data could be stored in a discrete profile data server disposed on network 20, and the IP address pool data 32 and correlation data 34, and could similarly be stored in one or more discrete data servers on network 20.

The profile data 30 preferably includes profile records for each mobile node that subscribes to communication service in the illustrated system (e.g., with a wireless carrier that owns and operates one or more pieces of the network infrastructure shown), keyed to device identifier such as MAC ID for instance. Thus, if a mobile node has an established service account, the profile data 30 would preferably include a profile record for the mobile node, whereas, if a mobile node does not have an established service account (e.g., if the mobile node is new and as yet unused), the profile data 30 might not include a profile record for the mobile node (or might include a profile record indicating that the mobile node is not yet provisioned for service.)

The profile record for a given mobile node may indicate a communication policy for that mobile node, such as one or more hotlining rules, access control rules, and/or intermediation rules, for example. Each communication policy may be indicated by a policy identifier, which may correlate with separate data (keyed to policy identifiers) that defines the policy more specifically. Communication policies for mobile nodes may be set statically at the time of subscription or at other times or may be generated dynamically based on various factors, such as exhaustion of prepaid account balances, extent of usage, network load, or time of day, for instance, and profile data 30 may be manually or automatically updated to indicate applicable policies per mobile node or per group of mobile node.

Further, the profile record for a given mobile node may indicate (implicitly or expressly) whether the mobile node has the right to access the network as a general matter, possibly requiring a password or other authentication data to validate such an access right. When mobile node 12 first attempts to connect with the network through access gateway 18, a device authentication process may occur between the mobile node 12, the gateway 18, and the AAA server 22 (or another AAA server). The details of this authentication process are not important, but the process typically involves the AAA server 22 referencing profile data to validate the right of the mobile node to access the network, and the AAA server 22 responsively approving access. For instance, upon receipt of a connection request from the mobile node 12, the gateway 18 may send a RADIUS Access Request message to the AAA server 22 providing the mobile node's MAC ID, the AAA server 22 may reference profile data 30 to validate the connection right, and the AAA server 22 may then respond to the gateway with an Access Accept message indicating that the connection is approved. (Alternatively, another authentication protocol providing similar messages could be used. For instance, the well known DIAMETER protocol could be used.) The gateway 18 may then allow the mobile node 12 to connect with the network.

Note also that access gateway 18 may also be able to disconnect a mobile node from the network, due to session expiration or for some other reason. Further, in some network arrangements, it may be possible for AAA server 22 to send to gateway 18 a directive for gateway 18 to disconnect mobile node 12 from the network for one reason or another, and gateway 18 may respond accordingly.

The IP address pool data 32 in AAA server 22 defines pools of Internet Protocol (IP) addresses (or, by analogy, other sorts of network addresses that could be assigned for use by mobile nodes). As is well known in the art, under the IPv4 standard, IP addresses can be represented in dot-decimal notation, with four octets in decimal separated by periods, such as 192.168.001.001, or in various other forms. Under IPv6, IP addresses are longer and can be represented in other or similar ways. Still other addressing schemes are possible as well.

The communication system of FIG. 1 may have a particular set of IP addresses that could be assigned for use by mobile nodes. For instance, a wireless carrier may own particular routable IP addresses or, if applying network address translation or the like, may have a set of local (not globally routable) IP addresses that the carrier can assign for use by mobile nodes that the carrier serves. The IP address pool data 32 divides these available IP addresses into pools or groups of any desired size (preferably two or more IP addresses per group), so that each pool can be correlated with a particular communication policy.

For simplicity, the pools can be defined in sequences of IP addresses, such as by having one pool be the addresses ending in the decimal octets 000 to 010, another pool be the addresses ending in the decimal octets 011 to 019, and so forth. Further, the various pools of IP addresses can include different numbers of IP addresses. Preferably, a pool of IP addresses that will be correlated with a very common communication policy will contain a greater number of IP addresses than a pool that will be correlated with a less common communication policy, to help ensure sufficient availability of IP addresses.

The IP address pool data 32 may define IP address pools by expressly indicating ranges of IP addresses or by expressly listing IP addresses in each pool. In one embodiment, for instance, the IP address pool data 32 may list all of the available IP addresses and may indicate for each IP address the IP address pool in which the address falls. For instance, the IP address pool data may include a table that lists in one column the available IP addresses and in another column the pool in which the address falls. Further, the IP address pool data may also indicate in a third column (e.g., with a Boolean indicator) whether or not the IP address is currently assigned for a mobile node. Other sorts of data schemes can be used as well.

The correlation data 34 defines correlations between communication policies and IP address pools. As such, the correlation data 34 could be integrated with the IP address pool data 32 as one combined set of data. For instance, a data table could be provided listing various IP address pools and, for each pool, a corresponding communication policy indicated by policy identifier for instance. Alternatively, each IP address pool could have a corresponding identifier, and the correlation data 34 could correlate each IP address pool with a corresponding communication policy.

Preferably, there will be a one-to-one relationship between IP address pools and communication policies (again, with the understanding that each communication policy could define one or more applicable policies). Thus, given a communication policy, one IP address pool would correlate, and given an IP address pool, one communication policy would correlate. However, there may also be scenarios where it makes sense to provide a one-to-many relationship or a many-to-many relationship.

The home agent 24 is likewise shown including IP address pool data 36 and correlation data 38, and the home agent is further shown including communication policy data 40 and MIP registration data 42. As with the data shown in the AAA server 22, it should be understood that any or all of this data could be stored outside of the home agent 24 and could still be accessible to the home agent 24 and perhaps to other network entities. Further, some common data could be provided for access by both the AAA server 22 and the home agent 24, or data on one of those entities could be accessible by the other entity. Other arrangements are possible as well.

In the home agent 24, the IP address pool data 36 is preferably the same as the IP address pool data 32 in the AAA server. Further, the correlation data 38 is preferably the same as the correlation data 34 in the AAA server. That way, when the AAA server selects an IP address for a mobile node based on the mobile node's applicable communication policy and the home agent assigns that IP address, the home agent will later be able to apply the corresponding communication policy when faced with a communication to or from that IP address.

To enable home agent 24 to apply of communication policies in practice, communication policy data 40 preferably defines each communication policy in sufficient detail for the home agent 24. For instance, by reference to policy identifiers used in the correlation data 34, the communication policy data 40 may provide parameters of one or more rules, such as hotlining rules, access control rules, intermediation rules, or the like. That way, when the home agent 24 receives a communication to or from a particular IP address, the home agent 24 can simply refer to the IP address pool data 36 to determine the pool in which the IP address falls, the home agent 24 can then refer to the correlation data 38 (if not already integrated with the IP address pool data 36) to determine the applicable communication policy, and the home agent 24 can then refer to the communication policy data 40 to determine the applicable communication policy. The home agent 24 may then apply that communication policy.

The MIP registration data 42 comprises data defining MIP registrations for mobile nodes. Under Mobile-IP, for instance, this data may indicate for each registered mobile node (i) the IP address assigned to the mobile node and (ii) a care-of address for routing IP packets to the mobile node in its current serving network. That way, when the home agent 24 receives a packet communication destined to a particular IP address, the home agent 24 can refer to the registration data to determine the corresponding care-of address and then route the packet to that care-of address for receipt by (or local transmission to) the mobile node.

When the home agent 24 receives a MIP registration request ("RRQ") message carrying an identifier of the mobile node, such as the mobile node's MAC address, the home agent may send a RADIUS Access Request message to the AAA server 22, and the AAA server 22 may reference profile data 30 to verify that the mobile node has the right to obtain an IP address. The AAA server 22 may then send an Access Accept message to the home agent 24, and the home agent 24 may responsively sends a MIP registration reply ("RRP") message assigning an IP address for the mobile node and updates registration data 42 accordingly.

In a basic MIP arrangement, the mobile node itself sends the MIP RRQ to the home agent and receives the MIP RRP from the home agent. In an alternative arrangement known as "proxy MIP," another network entity engages in the MIP registration process on behalf of the mobile node and may then convey the assigned IP address to the mobile node. In practice, for instance, an entity such as access gateway 18 may function as a MIP proxy for a mobile node and may use Dynamic Host Control Protocol (DHCP) messaging to facilitate interaction with the mobile node.

In particular, once the mobile node has connected with the gateway 18 and been authenticated, the mobile node may transmit a DHCP "Discover" message that provides the mobile node's ID and that operates to determine what network entity will be functions as a DHCP server to assign an IP address for use by the mobile node 12. Gateway 18 may then receive that DHCP Discover message and responsively engage in a MIP registration process on behalf of the mobile node. In particular, the gateway 18 may send an MIP RRQ to the home agent 24 purportedly from the mobile node 12. After engaging in RADIUS access validation messaging with the AAA server 22, the home agent 24 may then assign an IP address for the mobile node and return an MIP RRP designating that IP address. When the gateway receives the IP address assignment for the mobile node, the gateway may then send a DHCP "Offer" message to the mobile node, indicating that the gateway will be functioning as the DHCP server. The mobile node may then send a DHCP "Request" to the gateway, seeking a DHCP address assignment, and the gateway may responsively send to the mobile node a DHCP "Ack" assigning to the mobile node the IP address assigned by the home agent 24.

Continuing with reference to FIG. 1, provisioning server 26 may function to provision accounts for new mobile nodes, to maintain prepaid account balances, and/or otherwise to manage mobile node accounts. A given mobile node may be hotlined to the provisioning server 26 when first used or in response to one or more other triggering events. Remote node 28, in turn, may comprise any node with which the mobile node may attempt communication (or for that matter any node that may attempt communication with the mobile node), whether a server, a client, or another type of node.

Figure 2:
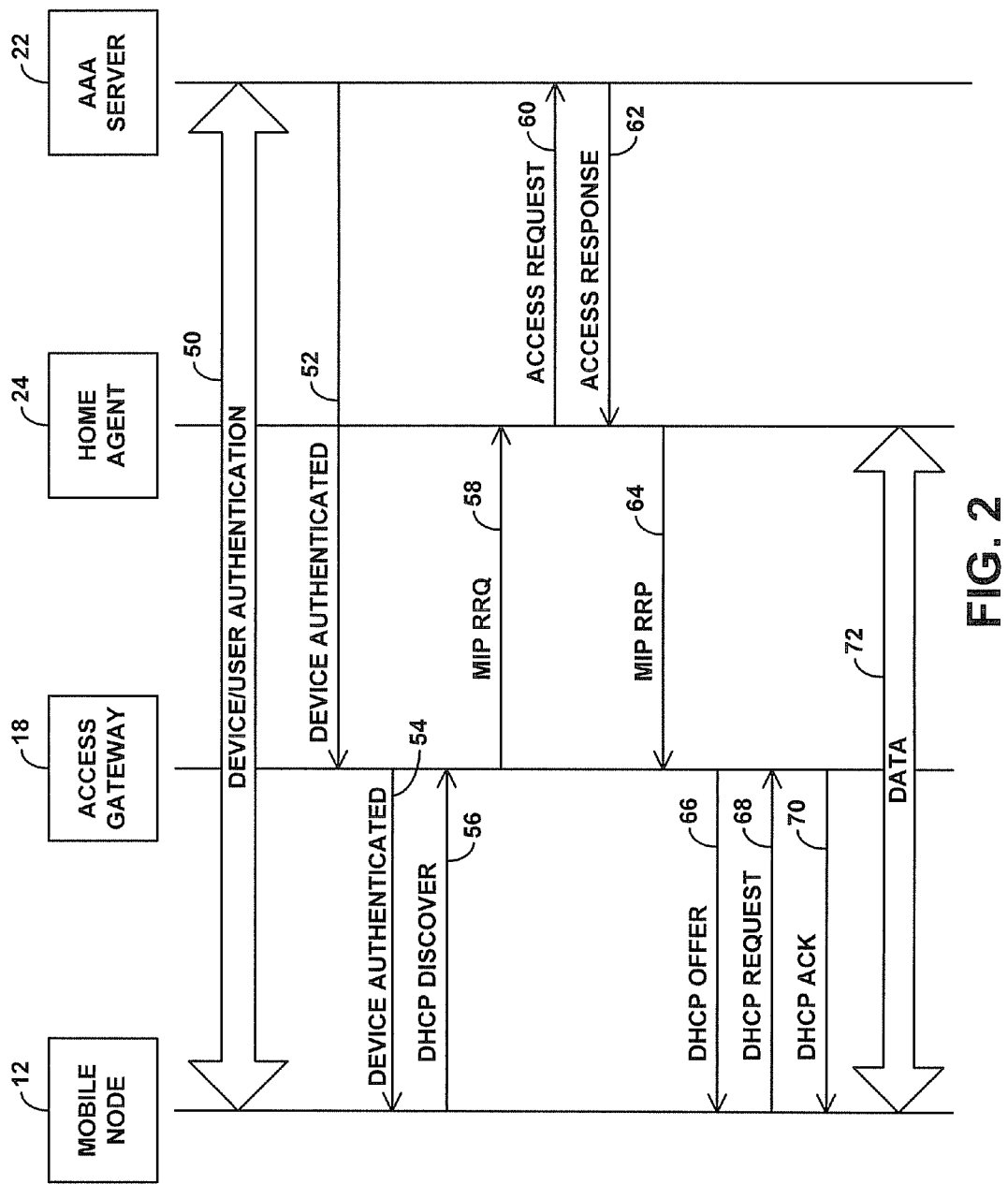
FIG. 2 is a message flow diagram depicting communication between various network entities shown in FIG. 1.

FIG. 2 depicts in summary a process that can occur when mobile node 12 connects with the network of FIG. 1. As shown in FIG. 2, when mobile node 12 seeks to connect with the network, a device authentication process occurs at step 50, with possible exchange of authentication data (such as user-name and password data) between the mobile node and the AAA server 22. At step 52, the AAA server then sends a positive device authentication message to the access gateway 18, and, at step 54, the access gateway sends a positive authentication message to the mobile node and grants network access to the mobile node.

At step 56, the mobile node then sends a DHCP Discover message, which the access gateway 18 receives. In response, at step 58, the gateway sends a MIP RRQ to the home agent 24. After sending an Access Request to the AAA server at step 60 and receiving an Access Accept from the AAA server at step 62, the home agent then sends to the gateway at step 64 a MIP RRP assigning an IP address for the mobile node. At step 66, the gateway then sends a DHCP Offer to the mobile node. And at steps 68 and 70, the mobile node requests and receives a DHCP address assignment assigning the IP address designated by the home agent 24. At step 72, the mobile node may then engage in packet data communication, with outbound communications from the mobile node preferably passing to the home agent 24 for transmission to their intended destination, and with inbound communications destined to the mobile node's assigned IP address passing to the home agent 24 for transmission in turn to the gateway 18 and then to the mobile node.

As noted above, the present invention involves assigning an IP address to a mobile node based on a communication policy that is to be applied with respect to the mobile node, so that a home agent receiving a communication destined to or from that IP address can readily apply the corresponding policy.

Figure 3:
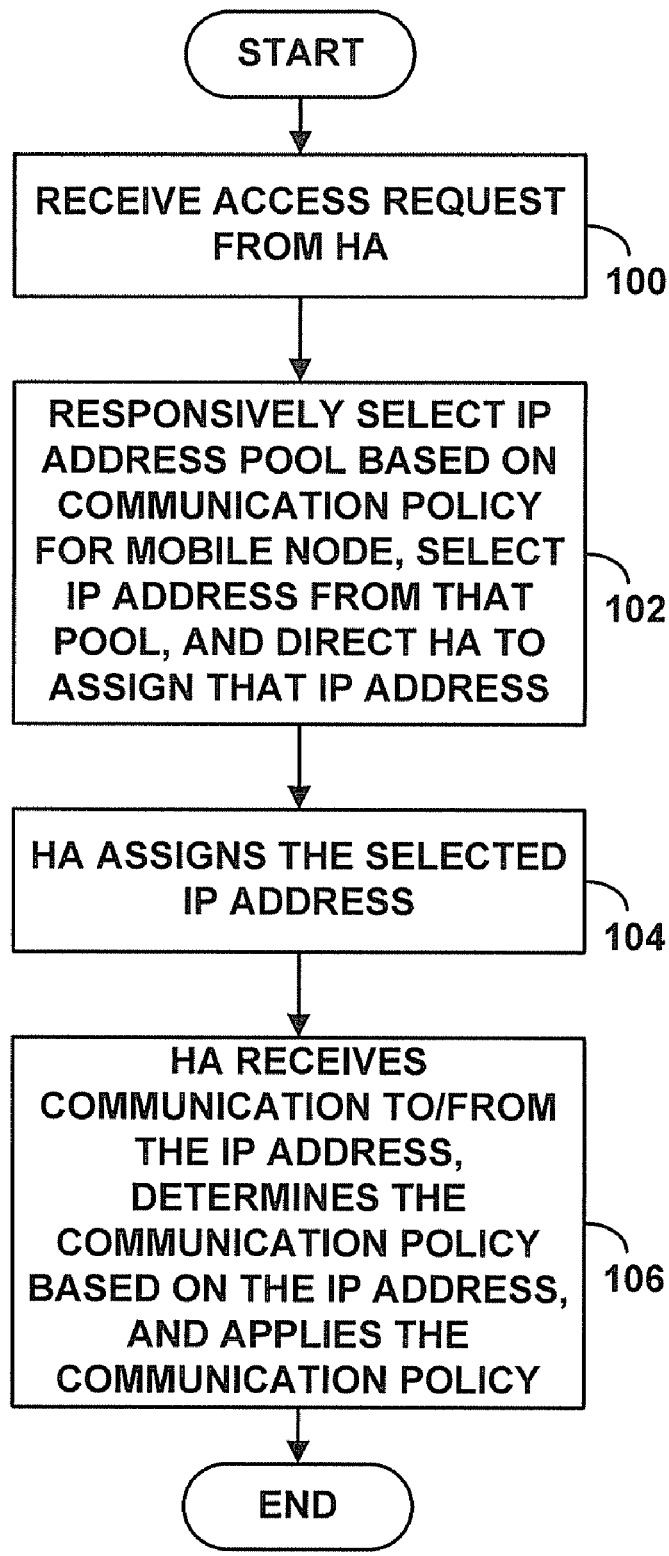
FIG. 3 is a flow chart depicting functions carried out in accordance with the exemplary embodiment.

An exemplary embodiment of the present invention may thus take the form of a method for imposing a communication policy (such as hotlining or any other policy) with respect to a mobile node, as summarized by the flow chart of FIG. 3.

This method may be carried out in the arrangement of FIG. 1, with corresponding network entities, or in another network arrangement.

As shown in FIG. 3, at step 100, the method involves receiving from a MIP home agent an access request for the mobile node. At step 102, the method then involves, responsive to the access request, selecting a pool of IP addresses based on a communication policy for the mobile node, and directing the home agent to assign an IP address from the selected pool. In turn, at 104, the home agent responsively assigns the IP address. And at step 106, the home agent thereafter (i) receives a communication to or from the IP address, (ii) determines the communication policy based on the IP address, and (iii) applies the communication policy.

The functions of receiving the access request, selecting the pool of IP addresses, and directing the home agent to assign an IP address from the selected pool may be carried out by AAA server or another entity. Further, the act of directing the home agent to assign an IP address from the selected pool may involve transmitting to the home agent a message that indicates the pool, in which case the act of the home agent assigning the IP address may involve the home agent selecting an address from the pool and assigning the selected address. Alternatively, the act of directing the home agent to assign an IP address from the selected pool may involve selecting an IP address from the selected pool and sending to the home agent a signaling message that indicates the selected IP address, in which case the act of the home agent assigning the IP address may involve the home agent simply assigning the indicated IP address. In either case, the message from the AAA server to the home agent may be a RADIUS Access Accept message or may take other forms.

Still further, the function of the home agent determining the communication policy based on the IP address may involve the home agent correlating the IP address to the communication policy. More particularly, the function may involve the home agent determining the pool of IP addresses from which the IP address was selected or more generally the pool that contains the IP address, and the home agent then determining as the communication policy a policy that corresponds with that pool of IP addresses. As noted above, for instance, the home agent may refer to IP address pool data 36 to determine the pool in which the IP address falls, the home agent 24 may then refer to the correlation data 38 (if not already integrated with the IP address pool data 36) to determine the applicable communication policy, and the home agent 24 may then refer to the communication policy data 40 to determine the applicable communication policy. Advantageously, with this process, a different policy can be determined and applied for one device's assigned IP address (being from one pool) than for another device's assigned IP address (being from another pool).

Further, as also noted above, this process can be invoked effectively during a communication session involving the mobile node (albeit possibly by forcing a temporary break in the communication session). In particular, during such a communication session, the AAA server 22 or another entity may determine that the communication policy should be applied (such as by detecting that a prepaid balance has been exhausted or detecting one or more other triggering events), and the method as described above may then be invoked.

To invoke the above method, the AAA server or other entity may send a signaling message to gateway 14 or other entity to cause the mobile node to be disconnected from the network (e.g., to be physically disconnected, to disconnect its data link, and/or to terminate its IP address registration/assignment). When that happens, the mobile node may then conventionally respond to the break in its session by attempting to newly to connect, at which time the above method steps may ensue.

Figure 4:
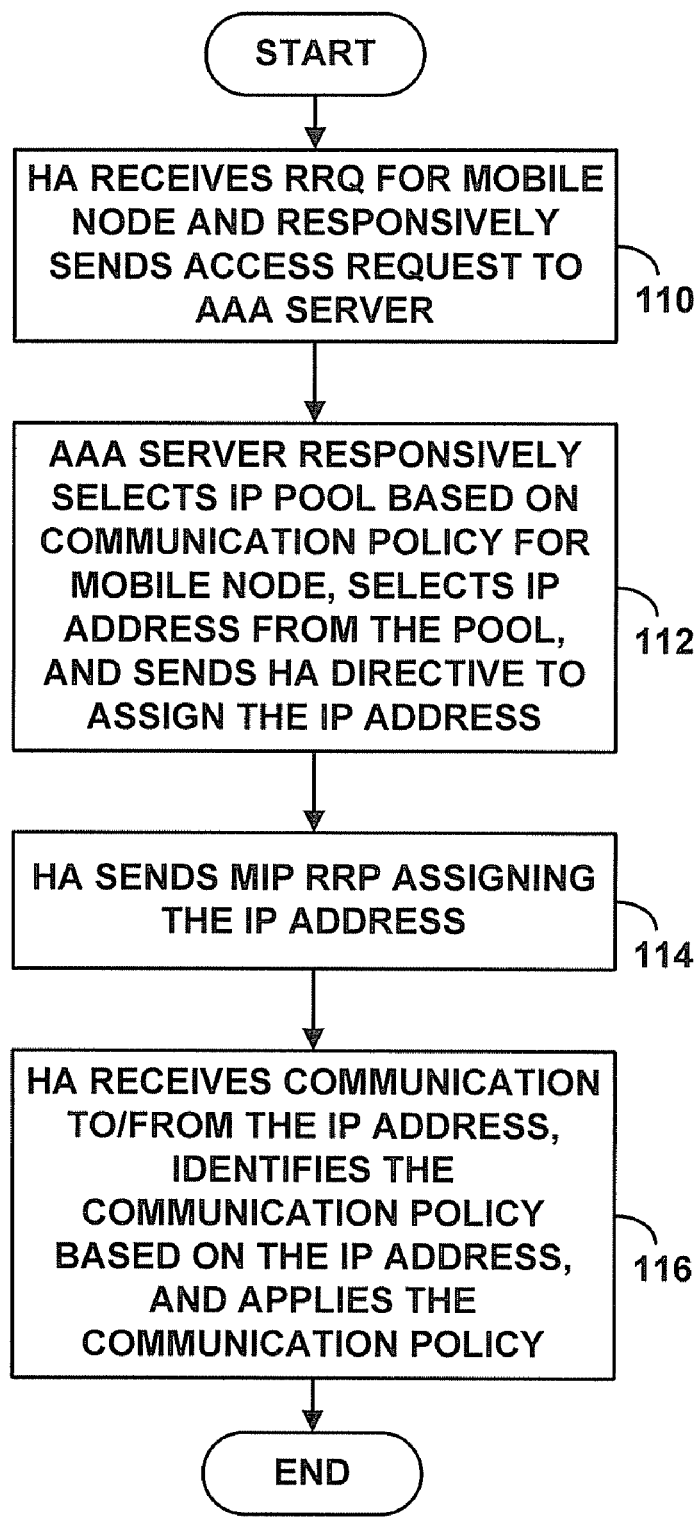
FIG. 4 is another flow chart depicting functions carried out in accordance with the exemplary embodiment.

FIG. 4 is a flow chair depicting another process for carrying out the exemplary embodiment, also possibly within the context of FIG. 1. As shown in FIG. 4, at step 110, a MIP home agent receives a MIP registration request seeking assignment of an IP address for a mobile node, and the home agent responsively transmits to an AAA server an access request identifying the mobile node. At step 112, responsive to the access request, the AAA server (i) selects, based on a communication policy, a given pool of IP addresses from among multiple pools of IP addresses, (ii) selects a given IP address from the given pool, and (iii) sends to the home agent (e.g., in a response to the access request) a directive to assign the given IP address for the mobile node. At step 114, upon receipt of the directive, the home agent then sends a MIP registration reply assigning the given IP address for the mobile node. And at step 116, the home agent thereafter receives a communication to or from the given IP address, and the home agent responsively identifies the communication policy based on the given IP address and applies the identified communication policy.

This inventive process may further involve the AAA server initially determining the communication policy for the mobile node, so as to then select the appropriate pool of IP addresses based on that communication policy. For instance, the AAA server may reference mobile node profile data and may read the communication policy from a profile record for the mobile node. Alternatively, the AAA server may determine that a service account (e.g., profile record) does not yet exist for the mobile node, and the AAA server may therefore determine that the communication policy is to hotline the mobile node to an account setup server. Still alternatively, if the AAA server is the same AAA server that conducts device authentication before the MIP registration process occurs (as in step 50 of FIG. 2, for instance), the AAA server may ascertain the applicable communication policy when performing device authentication and may set a flag or other data indicating the policy (or the applicable IP address pool). Thereafter, during MIP registration, the AAA server may then select an IP address from the address pool corresponding with that earlier ascertained policy.

As noted above, the function of the AAA server selecting a pool of IP addresses based on the communication policy may involve the AAA server referencing correlation data that correlates communication policies with pools of IP addresses, so as to determine that the given pool of IP addresses corresponds with the communication policy. Further, as also noted above, the AAA server may itself maintain the correlation data or may externally access the correlation data.

In addition, as also noted above, the MIP registration process may be a proxy MIP registration process. In that case, the act of receiving the MIP registration request that seeks assignment of an IP address for the mobile node may involve receiving the MIP registration request from a MIP proxy, seeking MIP registration on behalf of the mobile node. Further, the act of sending the MIP registration reply that assigns the selected IP address for the mobile node may involve sending the MIP registration reply to the MIP proxy.

In a preferred embodiment with proxy MIP, the MIP proxy may be a WiMAX access service node gateway (ASN-GW), but it could take other forms as well. Further, at least the functions of receiving of the MIP registration request, transmitting the access request, selecting the given pool, selecting the given IP address, sending the directive, and sending the registration reply may all occur between a time when the mobile node sends a DHCP Discover message to the ASN-GW and when the ASN-GW responsively sends a DHCP Offer message to the mobile node, i.e., between steps 56 and 66 of FIG. 2. Alternatively, these functions could occur at another time, such as between steps 68 and 70 of FIG. 2 for instance.

As further noted above, the act of the home agent identifying the communication policy based on the given IP address may involve the home agent determining which pool of IP addresses contains the given IP address and then identifying the communication policy based on the given pool. In particular, the home agent may reference internally or externally stored correlation data to identify the communication policy that corresponds with the pool containing the given IP address.

As additionally noted above, the communication policy can take various forms, examples of which include an access control rule, a hotlining rule, and a reporting rule. Still further, as also noted above, the method of the exemplary embodiment can be invoked mid-session by determining that a communication policy should be applied and responsively invoking the method. For instance, the AAA server 22 may make such a determination and responsively direct a network gateway serving the mobile node, such as access gateway 18, to disconnect the mobile node. In response, the mobile node may then newly connect with the network and thus trigger application of the above method.

The present invention can be usefully employed to facilitate hotlining of new devices, without the need to custom program various network access gateways. As such, the invention should be particularly useful in offering WiMAX services, since it is expected that millions of WiMAX-equipped devices will be sold without first being provisioned. When any such device seeks to obtain network connectivity for the first time, the present invention could apply to have the AAA server or another such entity determine (e.g., during device authentication or during MIP registration) that the device is not yet provisioned for service and to responsively direct the home agent to assign for the device an IP address that falls within a pool of addresses to be hotlined. Consequently, when the device first attempts an IP communication to remote node 28, the home agent could redirect the communication to provisioning server 26, for instance, to facilitate provisioning of a service account for the device.

An exemplary embodiment of the present invention has been described above. Those of ordinary skill in the art will appreciate that modifications from the embodiment described are possible while remaining within the scope of the invention as defined by the claims.

What is claimed is:

1. A method of imposing a communication policy with respect to a mobile node, the method comprising:
   receiving from a Mobile-IP (MIP) home agent an access request for the mobile node;
   responsive to the access request, selecting a pool of IP addresses based on a communication policy for the mobile node, and directing the home agent to assign an IP address from the selected pool;
   the home agent responsively assigning the IP address; and
   the home agent thereafter (i) receiving a communication to or from the IP address, (ii) determining the communication policy based on the IP address, and (iii) applying the communication policy.

2. The method of claim 1, wherein determining the communication policy based on the IP address comprises determining the pool from which the IP address was selected, and determining as the communication policy a communication policy corresponding with the pool.

3. A method comprising:
   during a communication session involving the mobile node of claim 1, determining that the communication policy should be applied, and responsively invoking the method of claim 1.

4. The method of claim 1, wherein the communication policy comprises hotlining.

5. A method of imposing a communication policy with respect to a mobile node, the method comprising:
   receiving into a Mobile-IP (MIP) home agent a MIP registration request seeking assignment of an IP address for the mobile node, and responsively transmitting from the home agent to an authentication, authorization, and accounting (AAA) server an access request identifying the mobile node;
   responsive to the access request, the AAA server (i) selecting, based on the communication policy, a given pool of IP addresses from among multiple pools of IP addresses, (ii) selecting a given IP address from the given pool, and (iii) sending to the home agent a directive to assign the given IP address for the mobile node;
   upon receipt of the directive, the home agent sending a MIP registration reply assigning the given IP address for the mobile node; and
   thereafter receiving into the home agent a communication to or from the given IP address, and the home agent responsively identifying the communication policy based on the given IP address and applying the communication policy.

6. The method of claim 5, further comprising the AAA server determining the communication policy for the mobile node.

7. The method of claim 6, wherein determining the communication policy for the mobile node comprises referencing mobile node profile data.

8. The method of claim 7, wherein determining the communication policy comprises determining from the profile data that a service account does not yet exist for the mobile node and responsively determining that the communication policy is to hotline the mobile node to an account setup server.

9. The method of claim 7, wherein determining the communication policy comprises reading the communication policy from a profile record for the mobile node.

10. The method of claim 6, further comprising:
    in advance of MIP registration, the AAA server ascertaining the communication policy for the mobile node,
    wherein determining the communication policy comprises determining as the communication policy the earlier ascertained communication policy.

11. The method of claim 5, wherein selecting, based on the communication policy, the given pool of IP addresses comprises referencing correlation data that correlates communication policies with pools of IP addresses, to determine that the given pool of IP addresses corresponds with the communication policy.

12. The method of claim 11, further comprising maintaining the correlation data at the AAA server.

13. The method of claim 5, wherein sending to the home agent the directive to assign the given IP address for the mobile node comprises sending the directive in a response to the access request.

14. The method of claim 5,
    wherein receiving the MIP registration request seeking assignment of an IP address for the mobile node comprises receiving the MIP registration request from a MIP proxy seeking MIP registration on behalf of the mobile node, and wherein sending the MIP registration reply assigning the selected IP address for the mobile node comprises sending the MIP registration reply to the MIP proxy.

15. The method of claim 14, wherein the MIP proxy comprises a WiMAX Access Service Node Gateway (ASN-GW).

16. The method of claim 15, wherein at least the receiving of the MIP registration request, the transmitting of the access request, the selecting of the given pool, the selecting of the given IP address, the sending of the directive, and the sending of the registration reply all occur between when the mobile node sends a Dynamic Host Control Protocol (DHCP) Discover message to the ASN-GW and when the ASN-GW responsively sends a DHCP Offer message to the mobile node.

17. The method of claim 5, wherein identifying the communication policy based on the given IP address comprises:
determining the given pool containing the given IP address; and
then identifying the communication policy based on the given pool.

18. The method of claim 17, wherein identifying the communication policy based on the given pool comprises referencing correlation data that correlates pools of IP addresses with communication policies, to determine that the given pool corresponds with the communication policy.

19. The method of claim 18, further comprising maintaining the correlation data at the home agent.

20. The method of claim 5, wherein the communication policy comprises at least one rule selected from the group consisting of an access control rule, a hotlining rule, and a reporting rule.

21. A method comprising:
during a communication session involving the mobile node of claim 5, determining that the communication policy should be applied, and responsively invoking the method of claim 5.

22. The method of claim 21, wherein invoking the method of claim 5 comprises directing a network gateway serving the mobile node to disconnect the mobile node, wherein upon disconnection of the mobile node mid-session, the mobile node then newly connects, thus triggering the method of claim 5.

23. A method of imposing a communication policy with respect to a mobile node, the method comprising:
receiving into a Mobile-IP (MIP) home agent a MIP registration request seeking assignment of an IP address for the mobile node, and responsively transmitting from the home agent to an authentication, authorization, and accounting (AAA) server an access request identifying the mobile node;
responsive to the access request, the AAA server (i) determining the communication policy, (ii) selecting, based on the communication policy, a given pool of IP addresses from among multiple pools of IP addresses, (iii) selecting a given IP address from the given pool, and (iv) sending to the home agent a directive to assign the given IP address for the mobile node, wherein selecting, based on the communication policy, the given pool of IP addresses comprises referencing correlation data that correlates communication policies with pools of IP addresses, to determine that the given pool of IP addresses corresponds with the communication policy, and wherein sending to the home agent the directive to assign the given IP address for the mobile node comprises sending the directive in a response to the access request;
upon receipt of the directive, the home agent sending a MIP registration reply assigning the given IP address for the mobile node; and
thereafter receiving into the home agent a communication to or from the given IP address, and the home agent responsively identifying the communication policy based on the given IP address and applying the communication policy, wherein identifying the communication policy based on the given IP address comprises determining the given pool containing the given IP address and correlating the given pool to the communication policy.

* * * * *